United States Patent
Tamura et al.

[19]

[11] Patent Number: 6,151,223
[45] Date of Patent: Nov. 21, 2000

[54] SELF-EXCITED DC-DC CONVERTER WITH TEMPERATURE COMPENSATION

[75] Inventors: Hideki Tamura, Moriyama; Mikihiko Yamashita, Shiga; Yoshinori Katsura, Hikone, all of Japan

[73] Assignee: Matsushita Electric Works, Ltd., Osaka, Japan

[21] Appl. No.: 09/330,376

[22] Filed: Jun. 11, 1999

[30] Foreign Application Priority Data

Jun. 12, 1998 [JP] Japan .................................. 10-165530

[51] Int. Cl.[7] .................................................. H02M 3/335
[52] U.S. Cl. ........................................... 363/19; 323/288
[58] Field of Search ........................... 363/190; 323/284, 323/282, 266, 288, 285

[56] References Cited

U.S. PATENT DOCUMENTS 4,626,982  12/1986  Huber ........................................ 363/80
5,392,206   2/1995  Peterson et al. ........................... 363/19

*Primary Examiner*—Shawn Riley
*Attorney, Agent, or Firm*—Muramatsu & Associates

[57] ABSTRACT

A self-excited DC-DC converter and a power supply device using the same which can produce a constant output voltage for a wide range of input voltage without using high voltage components. The self-excited DC-DC converter includes a first transistor for switching an input DC voltage to produce an output voltage whose voltage value is down converted from the input DC voltage, a primary winding one end of which is connected to a collector of the first transistor, a diode whose cathode is connected to a connection point of the first transistor and the primary winding and whose anode is connected to the ground, a capacitor connected between the other end of the primary winding and the ground, a feedback winding magnetically coupled to the primary winding and connected between a base and an emitter of the first transistor, and a second transistor provided between the base and emitter of the first transistor for bypassing a base current of the first transistor in such a way that the amount of bypassing the base current is regulated in response to a value of the output voltage.

12 Claims, 5 Drawing Sheets

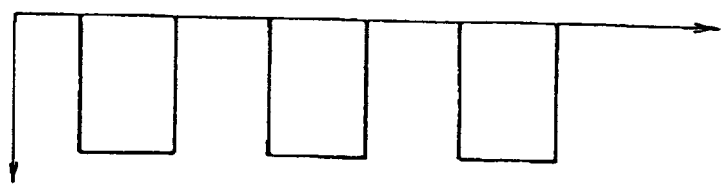
Fig. 6(a) V1
(Prior Art)
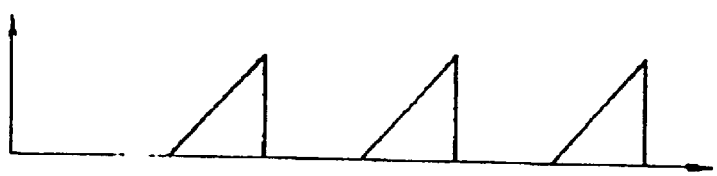
Fig. 6(b) I1
(Prior Art)
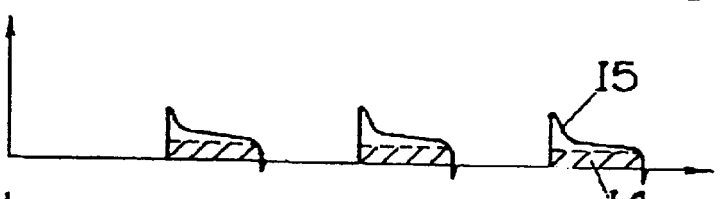
Fig. 6(c) I2
(Prior Art)
Fig. 6(d) I3
(Prior Art)

SELF-EXCITED DC-DC CONVERTER WITH TEMPERATURE COMPENSATION

FIELD OF THE INVENTION

This invention relates to a self-excited DC-DC converter and a power supply device using the same, and more particularly, to a self-excited DC-DC converter with temperature compensation which can produce a constant output voltage for a wide range of input voltage level without using high voltage and large size components.

BACKGROUND OF THE INVENTION

DC to DC (DC-DC) converters operate to convert an input DC voltage to an output DC voltage with isolation between the input and output. Such converters normally utilize high frequency switching technique. There are many different types of converters each having specific advantages and disadvantages. The present invention is directed to a self-excited DC-DC converter and a power supply device using such a DC-DC converter.

FIG. 5 shows an example of a self-excited DC-DC converter in the conventional technology. In this example, the self-excited DC-to-DC converter has a series circuit connected between input terminals t1 and t2 and formed of a PNP transistor Q1, a primary winding L1, and a capacitor C2, a voltage drop chopper circuit formed of a diode D1 whose cathode is connected to the connection point of the transistor Q1 and the primary winding L1 while its anode is connected to the connection point (ground) of the capacitor C2 and the input terminal t2. A feedback winding L2 that is magnetically coupled to the primary winding L1 is connected across a base and an emitter of the transistor Q1 through a capacitor C1.

Further in FIG. 5, a series circuit comprising resistors R5 and R6 connected between both terminals of the capacitor C2. The base of an NPN transistor Q7 connects with the connection point of resistors R5 and R6. The collector of the transistor Q7 connects to the base of a transistor Q6 as well as to the emitter of the transistor Q1 via a resistor R10. The collector of the NPN transistor Q6 connects with the base of the transistor Q1 through the resistor R9, and the emitter of the transistor Q6 connects with the ground.

The operation of this self-excited DC-DC converter is described below. FIGS. 6(a) to 6(d) show the waveforms involved in this circuit. When the DC input voltage source E is supplied to the input terminals t1 and t2, a base current flows to the transistor Q6 through the resistor R10, thereby turning on the transistor Q6. As the transistor Q6 turns on, the base current I4, which is a difference between I2 in FIG. 6(c) and I5, flows to the transistor Q1 through the transistor R9, and the transistor Q1 turns on. As the transistor Q1 turns on, the collector current I1 shown in FIG. 6(b) flows in the transistor Q1, thereby generating a potential difference across the primary winding L1.

Accordingly, a potential difference is also generated across the feedback winding L2 that is magnetically coupled to the primary winding L1. The transistor Q1 is biased due to the potential difference across the feedback winding L2, which immediately turns on the transistor Q1. At this time, the capacitor C2 charges electricity via the path formed from the input voltage source E, transistor Q1, primary winding L1, capacitor C2, to input voltage source E. Thus, energy is provided to the capacitor C2 and a load circuit (not shown) connected across output terminals t3 and t4.

The collector current I1 flowing through the transistor Q1 increases by the parameter determined by the inductance of the primary winding L1. Since the base current I4 of the transistor Q1 is determined by the resistor R9 and the transistor Q6, when the current I1 becomes larger than I4×$h_{FE}$ (where $h_{FE}$ is a current gain in the transistor Q1), the base current I4 fails to keep the saturation of the transistor Q1, and the transistor Q1 goes to the non-saturation region. Thus, the voltage V1 (collector-emitter voltage of the transistor Q1) shown in FIG. 6(a) increases.

As the voltage V1 increases, the voltage across the primary winding L1 decreases, and the voltage across the feedback winding L2 which is magnetically coupled to the primary inductor L1 also decreases. Accordingly, the base current I4 of the transistor Q1 decreases, resulting in the further increase in the voltage V1 across the collector-emitter of the transistor Q1, which turns off the transistor Q1 rapidly. At this time, the energy stored in the primary winding L1 when the transistor Q1 is on transfers to the capacitor C2 and the load circuit through the path formed by the primary winding L1, capacitor C2, diode D1, and primary winding L1. When the energy stored in the primary winding L1 is completely discharged, the base current flows again to the base of the transistor Q1. The oscillation in this circuit continues by repeating the process described above. The current I3 in the diode D1 is shown in FIG. 6(d).

In the example of FIG. 5, the DC-DC converter circuit controls the base current of the transistor Q6 by a circuit arrangement comprising resistors R5, R6 and a transistor Q7 based on an output voltage, and thus controls the base current I4 of the transistor Q1. For example, when the output voltage increases due to a decrease in the load, the voltage at the connection point of the resistors R5 and R6 increases. Hence, the current flowing through the transistor Q7 increases, which decreases the base voltage of the transistor Q6 as well as the base current of the transistor Q6. Since the collector current of the transistor Q6 decreases, the base current I4 of the transistor Q1 also decreases, which quickens (advances) the timing of the transistor Q1 to go to the off state. Therefore, the peak value of the current I1 decreases, thereby limiting the increase of the output voltage.

On the other hand, when the output voltage decreases due to an increase in the load, the voltage at the connection point of the resistors R5 and R6 decreases. Hence, the current flowing through the transistor Q7 decreases, the base voltage of the transistor Q6 increases, and the base current of the transistor Q6 increases. Accordingly, the base current I4 of the transistor Q1 increases, which delays the timing of the transistor Q1 to go to the off state. Consequently, the peak value of the current I1 increases, thereby limiting the decrease of the output voltage.

As described in the foregoing, in this circuit, the circuitry comprising the resistors R5, R6 and transistor Q7 controls the base current of the transistor Q6 based on the output voltage, and controls the base current I4 of the transistor Q1, thereby maintaining the constant output voltage to the load circuit. The more detailed description of this conventional DC-DC converter circuit is given in the Japanese Patent Laid-Open Publication No.5-2585.

The conventional DC-DC converter described in the foregoing enables to maintain the constant output voltage with a simple circuit configuration. However, when the input voltage source E is produced from the wide voltage range of commercial power sources such as AC100V–AC240V by rectifying and smoothing the same, a high voltage may be applied to the resistor R9 and the transistor Q6 which control the base current I4 of the transistor Q1.

Because of the high voltage, a large base current ranging from several mA (milliampere) to several ten mA flows in the transistor Q6, resulting in the increase in the heat dissipation and power loss by the transistor Q6. In addition, components of high breakdown voltage must be used, which increases the overall size of the converter circuit. Moreover, because the current flowing through the transistor Q7 changes in response to the voltage level of the input voltage source E, constant voltage feedback by the transistor Q7 is unavailable.

SUMMARY OF THE INVENTION

Therefore, it is an object of the present invention to provide a self-excited DC-DC converter with low power loss and small size, and can be used even when the input voltage level varies in a wide range.

It is another object of the present invention to provide a self-excited DC-DC converter which can produce an output voltage with high stability by having a temperature compensation means for compensating voltage changes caused by a temperature characteristics of a load circuit connected to the DC-DC converter.

It is a further object of the present invention to provide a power supply device formed of a self-excited DC-DC converter of the present invention and a switching power supply which is able to produce an output voltage with high stability with low power dissipation.

It is a further object of the present invention to provide a power supply device formed of a self-excited DC-DC converter and a switching power supply which is capable of producing an output voltage with high stability by having means for temporarily suspending the switching operation in the switching power supply.

In order to achieve the objectives described in the foregoing, in one aspect of the present invention, the self-excited DC-DC converter includes a first transistor for switching an input DC voltage to produce an output voltage whose voltage value is down converted from the input DC voltage, a primary winding, one end of which is connected to a collector of the first transistor, a diode whose cathode is connected to a connection point of the first transistor and the primary winding and whose anode is connected to the ground, a capacitor connected between the other end of the primary winding and the ground, a feedback winding magnetically coupled to the primary winding and connected between a base and an emitter of the first transistor, and a second transistor provided between the base and emitter of the first transistor for bypassing a base current of the first transistor in such a way that the amount of bypassing the base current is regulated in response to a value of the output voltage.

In another aspect of the present invention, the self-excited DC-DC converter further includes a temperature compensation means for compensating a temperature change in the output voltage caused by a load circuit. The temperature compensation means has a temperature characteristics opposite to that of the load circuit. An example of the temperature compensation means is a Zener diode provided between the output voltage and the second transistor for compensating the amount of bypassing the base current to the first transistor.

A further aspect of the present invention is a power supply device which is comprised of a self-excited DC-DC converter for producing an output voltage by down converting an input voltage and a switching power supply having a switching element for switching the output voltage from the DC-DC converter to produce a desired voltage level. The self-excited DC-DC converter is configured by the elements noted above.

A suspending means is provided in the switching power supply for temporarily suspending an operation of the switching element until the output voltage of the DC-DC converter reaches a predetermined voltage level.

BRIEF DESCRIPTION OF THE DRAWINGS

FIGS. 6(a)–6(d) are timing charts showing the waveforms for explaining the operation of the self-excited DC-DC converter of FIG. 5.

DETAILED DESCRIPTION OF THE PREFERRED EMBODIMENTS

Figure 1:
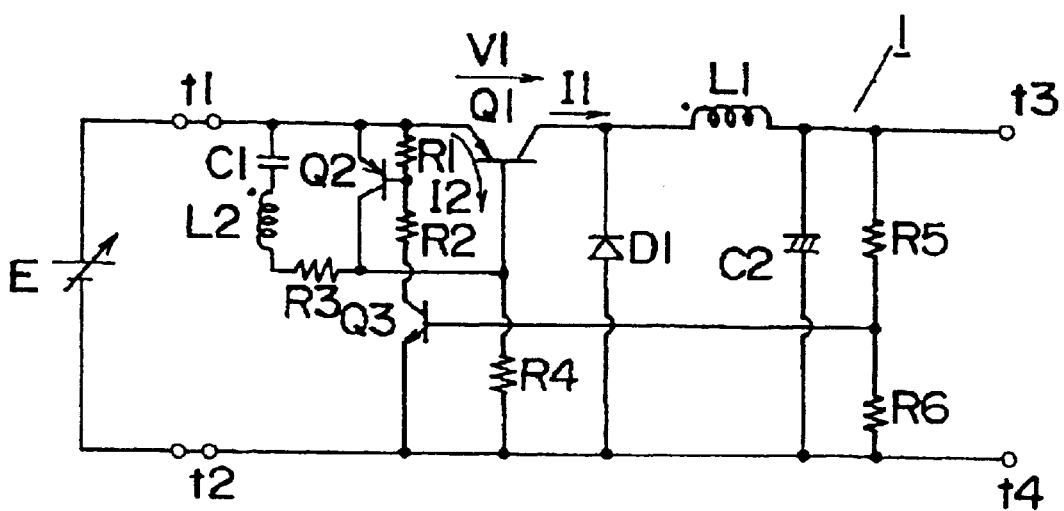
FIG. 1 is a circuit diagram showing a configuration of a self-excited DC-DC converter in the first embodiment of the present invention.
Figure 2:
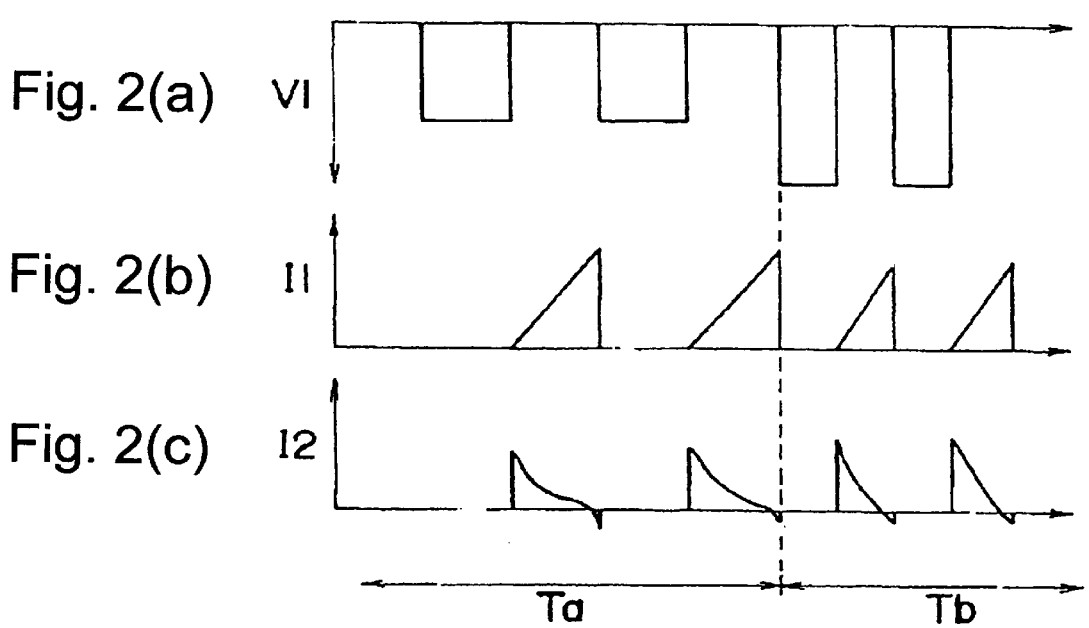
FIGS. 2(a)–2(c) are timing charts showing the waveforms for explaining the operation of the self-excited DC-DC converter in the first embodiment.

The first embodiment of the self-excited DC-DC converter of the present invention is described with reference to FIGS. 1 and 2(a)–2(c). A circuit diagram of the self-excited DC-DC converter in the first embodiment is shown in FIG. 1. The waveforms showing the operation of the self-excited DC-DC converter in the first embodiment are shown in FIGS. 2(a)–2(c).

In FIG. 1, the self-excited DC-DC converter 1 includes a series circuit connected between input terminals t1 and t2 and formed of a PNP transistor Q1, a primary winding L1, and a capacitor C2, a voltage drop (down convert) chopper circuit formed of a diode D1 whose cathode is connected to the connection point of the transistor Q1 and the primary winding L1 while its anode is connected to the connection point (ground) of the capacitor C2 and the input terminal t2. A feedback winding L2 that is magnetically coupled to the primary winding L1 is connected across a base and an emitter of the transistor Q1 through a series circuit formed of a capacitor C1 and a resistor R3.

The base of the transistor Q1 connects to the ground through a resistor R4. A series circuit comprising resistors R5 and R6 connects to both ends of the capacitor C2. The base of an NPN transistor Q3 connects with the connection point of the resistors R5 and R6. The emitter of the transistor Q3 connects to the ground, and the collector of the transistor Q3 connects to the emitter of the transistor Q1 through a series circuit formed of resistors R1 and R2. The base of a PNP transistor Q2, that is a second transistor, connects to the connection point of the resistors R1 and R2. The emitter of the transistor Q2 connects to the emitter of the transistor Q1, and the collector of the transistor Q2 connects to the base of the transistor Q1.

The operation of the self-excited DC-DC converter 1 is explained below. When the DC input voltage source E is applied to the input terminals t1 and t2, a base current flows to the transistor Q1 through the resistor R4, thereby turning on the transistor Q1. As the transistor Q1 turns on, the collector current I1 shown in FIG. 2(b) flows from the transistor Q1, which produces a potential difference across the primary winding L1. A potential difference is also generated across the feedback winding L2 that is magnetically coupled to the primary inductor L1. Since the transistor Q1 is biased due to the potential difference in the feedback winding L2, the transistor Q1 rapidly turns on. At this time, the capacitor C2 charges electricity via the path extending from the input voltage source E, transistor Q1, primary winding L1, capacitor C2, and to input voltage source E. The energy is charged in the capacitor C2 and a load circuit (not shown) connected across the output terminals t3 and t4.

The collector current I1 flowing through the transistor Q1 increases by the parameter determined by the inductance of the primary winding L1. When the current I1 becomes larger than the base current multiplied by current gain $h_{FE}$ of the transistor Q1, the base current fails to keep the saturation of the transistor Q1, and the transistor Q1 operates in the non-saturation region. Thus, the voltage V1 (collector-emitter voltage of the transistor Q1) shown in FIG. 2(a) increases. As the voltage V1 increases, the voltage across the primary winding L1 decreases, resulting in the decrease in the voltage across the feedback winding L2 which is magnetically coupled to the primary winding L1. Thus, the base current I2 of the transistor Q1 shown in FIG. 2(c) decreases, which further increase the voltage V1 across the collector-emitter of the transistor Q1, and the transistor Q1 rapidly turns off.

When the transistor Q1 turns off, the energy stored in the primary winding L1 when the transistor Q1 is in the on state transfers to the capacitor C2 and the load circuit via the path extending from the primary winding L1, capacitor C2, diode D1, and to the primary winding. When the energy stored in the primary winding L1 is completely discharged, the base current flows to the base of the transistor Q1, thereby turning on the transistor Q1. The oscillation in the DC-DC converter continues by repeating the process described above.

In the DC-DC converter of FIG. 1, the circuitry comprising resistors R1, R2, R5 and R6 and transistors Q2 and Q3 controls the base current of the transistor Q1 based on the output voltage. For example, when the output voltage increases (the period Tb in FIG. 2) due to the voltage fluctuation of the input voltage source E and/or the fluctuation of the load, the voltage at the connection point of the resistors R5 and R6 increases. Thus, the base current of the transistor Q3 increases, and the collector current of the transistor Q3 also increases.

Because of the increase in the collector current, the potential difference across the resistor R1 increases, and the base current of the transistor Q2 also increases. Since a portion of the base current of the transistor Q1 is bypassed through the transistor Q2, when the base current of the transistor Q2 increases, the amount of bypassing the base current of the transistor Q1 increases. Thus, the base current of the transistor Q1 decreases, which quickens (advances) the timing for the transistor Q1 to turn off, and thereby decreasing the output voltage.

On the other hand, when the output voltage decreases (the period Ta in FIG. 2) due to the voltage fluctuation of the input voltage source E and/or the fluctuation of the load, the voltage of the connection point of the resistors R5 and R6 decreases. Thus, the base current of the transistor Q3 decreases, and the collector current of the transistor Q3 decreases accordingly. At this time, because of the decrease in the collector current, the potential difference across the resistor R1 decreases, thereby decreasing the base current of the transistor Q2. As a result, the amount of bypassing the base current of the transistor Q1 through the transistor Q2 decreases. Thus, the base current of the transistor Q1 increases, which delays the timing for the transistor Q1 to turn off, thereby increasing the output voltage.

As described in the foregoing, in the self-excited DC-DC converter 1 in this embodiment, the transistor Q2 that is connected across the base and emitter of the transistor Q1 bypasses a part of the base current I2 of the transistor Q1. By changing the amount of current bypassing the base current based on the output voltage, the transistor Q1 can change the timing of the transistor Q1 to turn off, and thus controls the output voltage to be constant.

In this arrangement, the resistance value of the resistor R4 can be small since only a small base current required to drive the transistor Q1 needs to flow through the resistor R4. Therefore, the power consumption in the resistor R4 is small. Further, the transistor Q2 that controls the base current of the transistor Q1 is connected across the base and emitter of the transistor Q1, and operates under a relatively small potential difference compared to the voltage of the input voltage source E. Hence, the power consumption and heat dissipation incurred by the transistor Q2 can be small. In addition, since a transistor of low breakdown voltage can be used for the transistor 2, and such a transistor is small in size, the overall size of the self-excited DC-DC converter 1 can be reduced.

Figure 3:
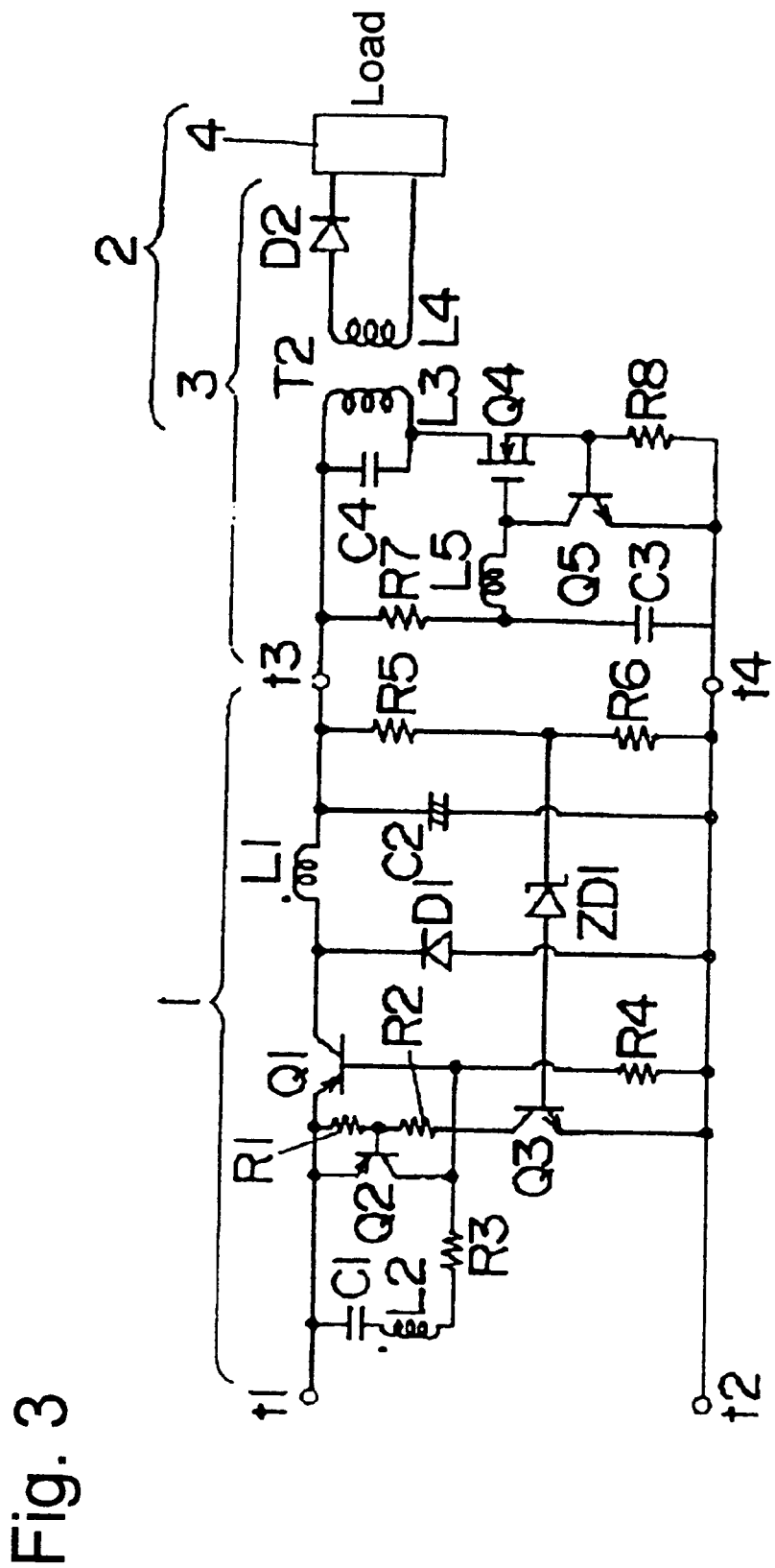
FIG. 3 is a circuit diagram showing a configuration of a power supply device having a self-excited DC-DC converter in the second embodiment of the present invention.

The second embodiment of the present invention is shown in FIG. 3 which is a power supply device using a self-excited DC-DC converter. Since the basic circuit configuration of FIG. 3 is similar to that of the first embodiment of FIG. 1, identical reference labels are used for the corresponding components, and the description of which is not given here.

The power supply device in this embodiment comprises a self-excited DC-DC converter which down converts the input voltage, and a switching power supply 3 which switches the output voltage of the self-excited DC-DC converter 1 by a switching element to convert the output voltage of the converter to a desired voltage level.

The self-excited DC-DC converter 1 is configured in almost the same manner as the circuit shown in FIG. 1 described in the foregoing. A Zener diode ZD1 is provided therein, a cathode of which is connected to the connection point of the resistors R5 and R6, and an anode of which is connected to the base of the transistor Q3.

The output terminals t3 and t4 of the self-excited DC-DC converter 1 are connected to the switching power supply 3. The switching power supply 3 includes a first series circuit provided between the terminals t3 and t4 and comprised of a resonant circuit configured with a primary winding L3 of a transformer T2 and a capacitor C4, a MOS field effect transistor (hereafter "MOSFET") Q4 that functions as a switching element, and a resistor R8. The switching power supply 3 further includes a second series circuit provided between the terminals t3 and t4 and comprised of an NPN transistor Q5 whose base is connected to the source of the MOSFET Q4 and whose collector is connected to the gate of the MOSFET Q4, and whose emitter is connected to the ground, a resistor R7, and a capacitor C3.

The gate of the MOSFET Q4 connects to the connection point of the resistor R7 and the capacitor C3 through a feedback winding L5 of the transformer T2. A load 4 is connected at the secondary winding L4 of the transformer T2 through a diode D2. By the on and off operation of the MOSFET Q4, the current introduced into the primary winding L3 from the self-excited DC-DC converter is switched on and off. Thus, voltages are induced across the secondary winding L4 and the feedback winding L5 of the transformer T2. The switching power supply 3 and the load 4 constitute a load circuit 2 for the self-excited DC-DC converter 1.

The operation of the switching electric source 3 is explained below. When the output voltage from the DC-DC converter 1 is provided to the switching power supply 3, the capacitor C3 charges electricity through the resistor 7. When the voltage across the capacitor C3 reaches the threshold voltage of the MOSFET Q4, the MOSFET Q4 turns on. As the MOSFET Q4 turns on, an electric current flows through the primary winding L3 of the transformer T2 via the MOSFET Q4, and a potential difference is induced to the feedback winding L5 from the primary winding L3. Thus, the current flowing through the MOSFET Q4 increases.

Such a current flowing though the MOSFET Q4 changes almost linearly. A potential difference is produced across the resistor R8 because of the current flowing through the MOSFET Q4. When this potential difference exceeds the threshold voltage of the transistor Q5, the transistor Q5 turns on. The gate voltage of the MOSFET Q4 is discharged through the transistor Q5, thereby turning off the MOSFET Q4. Consequently, the resonant circuit comprising the primary winding L3 and the capacitor C4 begins to oscillate. By the time when one cycle of the oscillation by the resonant circuit ends, the voltage induced at the feedback winding L5 reaches a voltage level that is required to turn on the gate of the MOSFET Q4. Hence, the MOSFET Q4 turns on again. By repeating the operation described above, the oscillation in the switching power supply 3 continues in a stable manner.

In the switching power supply device of FIG. 3, when the ambient temperature goes higher, the base-emitter voltage of the transistor Q5 decreases, which quickens (advances) the timing of the MOSFET Q4 to turn off. Thus, the current flowing in the MOSFET Q4 decreases, which may decrease the output voltage level for the load 4. In order to compensate for such a temperature fluctuation in the output voltage, a zener diode that has a temperature characteristic opposite to that of the transistor 5 may be connected to the base of the transistor Q5. However, in such an arrangement, a voltage across the resistor R8 need to be increased, requiring a resistor of a higher power and breakdown voltage having a larger physical size.

To overcome the disadvantage described above, in the DC-DC converter of FIG. 3, a zener diode ZD1 having a positive temperature characteristics (versus negative temperature characteristics of the transistor Q5) that acts as a temperature compensation means is connected to the connection point of the resistors R5 and R6. When the ambient temperature goes up, the zener voltage of the zener diode ZD1 increases, which in turn lowers the base voltage of the transistor Q3. Because the collector current of the transistor Q3 decreases, the voltage across the resistor R1 decreases.

Therefore, the bypass current flowing through the transistor Q2 decreases, resulting in the increase in the base current of the transistor Q1. Thus, the timing for the transistor Q1 to turn off is delayed, thereby increasing the output voltage of the self-excited DC-DC converter 1. Hence, the decrease of the output voltage of the switching power supply 3 due to the temperature increase can be compensated by increasing the output of the self-excited DC-DC converter 1. Thus, the temperature characteristic of the load circuit 2 (switching power supply 3 and load 4) is compensated, and a constant voltage is applied to the load 4.

Figure 4:
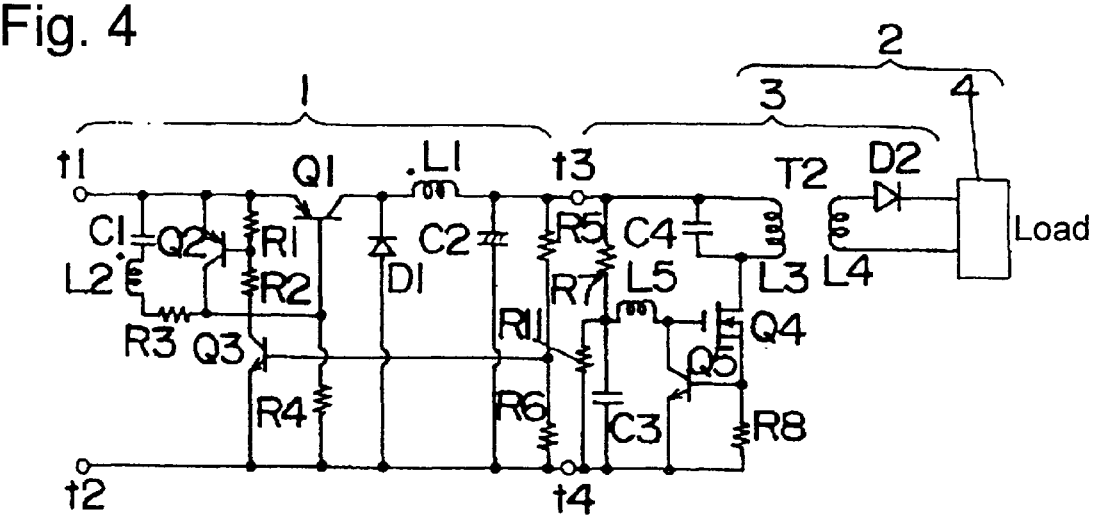
FIG. 4 is a circuit diagram showing a configuration of a power supply device having a self-excited DC-DC converter in the third embodiment of the present invention.
Figure 5:
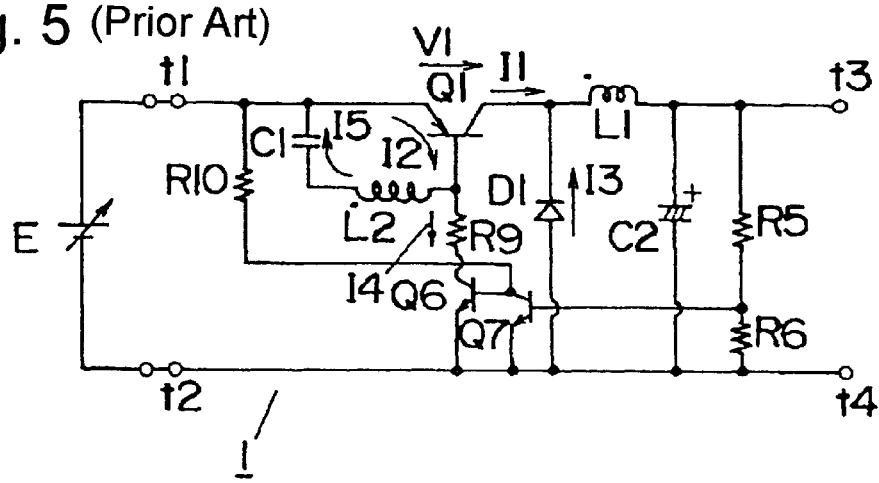
FIG. 5 is circuit diagram showing a configuration of a self-excited DC-to-DC converter in the conventional technology.

The third embodiment of the present invention is shown in FIG. 4 which is a power supply device using a self-excited DC-DC converter. Since the basic circuit configuration of FIG. 3 is similar to that of the first embodiment of FIG. 1 and the third embodiment of FIG. 3, identical reference labels are used for the corresponding components, and the description of which is omitted.

In the second embodiment in the foregoing, the power supply device shown in FIG. 3 may involve the following problem. When the input voltage source E is applied to the self-excited DC-DC converter 1, the capacitor C2 is charged in the manner described in the foregoing, and the voltage across the capacitor C2 increases. On the other hand, at the switching power supply 3, the current from the input voltage source E charges the capacitor C3 through the resistor R7. When the voltage across the capacitor C3 exceeds the threshold voltage of the gate, the MOSFET Q4 turns on, and when the potential difference across the resistor R8 exceeds the threshold voltage of the transistor Q5, the transistor Q5 turns on. The gate voltage of the MOSFET Q4 is discharged through the transistor Q5, thereby turning off the MOSFET Q4, and the resonant circuit comprising the primary winding L3 and the capacitor C4 begins oscillation.

In this instance, since the load current rapidly increase, the electric charge in the capacitor C2 is provided to the switching power supply 3, which may decrease the voltage across the capacitor C2. When the electric current charged in the capacitor C2 and the electric current provided to the switching power supply 3 from the capacitor C2 are balanced with one another, the voltage across the capacitor C2 will no longer increase. Consequently, the voltage across the capacitor C2, i.e., the output voltage of the DC-DC converter 1 may become lower than that intended.

To overcome this disadvantage, in the third embodiment shown in FIG. 4, a resistor R11 is connected in parallel to the capacitor C3. The resistors R7 and R11 and the capacitor C3 form a suspension means that temporarily suspend the switching operation of the MOSFET Q4. At the start of the operation, until the voltage across the capacitor C2 exceeds the predetermined voltage defined by the voltage divider formed of the resistors R7 and R11 and the threshold voltage of the MOSFET Q4, the voltage across the capacitor C3 will not reach the threshold voltage of the MOSFET Q4.

Hence, the oscillation of the switching power supply 3 can be suspended, and the voltage across the capacitor C2, i.e., the output voltage of the self-excited DC-DC converter 1 can exceed the predetermined voltage. Thus, the present invention can prevent the decrease of the output voltage of the switching power supply 3 caused by the decrease of the output voltage of the self-excited DC-DC converter 1.

As in the foregoing, in the first embodiment, the transistor Q2 that controls the base current of the transistor Q1 is connected across the base and emitter of the transistor Q1, and operates under a relatively small potential difference compared to the voltage of the input voltage source E. Thus, the power consumption and heat dissipation incurred by the transistor Q2 can be small. Further, since a low breakdown voltage transistor can be used for the transistor 2, and such a transistor is small in size, the overall size of the self-excited DC-DC converter 1 can be reduced. Moreover, since the transistor Q2 controls the base current of the transistor Q1 by regulating the bypass current, the control of the base current is achieved to generate the desired output voltage even when the input voltage changes in a wide range.

In the second embodiment, the temperature compensation means such as the zener diode is provided in the power supply circuit. The temperature compensation circuit has a temperature characteristics which is opposite to that of the load of the DC-DC converter. Thus, the temperature characteristic of the load is compensated, and a constant voltage is generated at the output of the power supply device.

In the third embodiment, the switching power supply includes the suspension means that temporarily suspend the switching operation of the switching element. At the start of the operation, until the voltage across the capacitor C2 exceeds the predetermined voltage, switching operation in the switching power supply is suspended. Thus, the output voltage of the self-excited DC-DC converter can reach the predetermined voltage, thereby preventing the decrease of the output voltage of the switching power supply caused by the decrease of the output voltage of the self-excited DC-DC converter.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A self-excited DC-DC converter comprising:
   a first transistor for switching an input DC voltage to produce an output voltage whose voltage value is down converted from the input DC voltage;
   a primary winding one end of which is connected to a collector of the first transistor;
   a diode whose cathode is connected to a connection point of the first transistor and the primary winding and whose anode is connected to the ground;
   a capacitor connected between the other end of the primary winding and the ground;
   a feedback winding magnetically coupled to the primary winding and connected between a base and an emitter of the first transistor; and
   a second transistor Provided between the base and emitter of the first transistor for bypassing a base current of the first transistor in such a way that the amount of bypassing the base current is regulated in response to a value of the output voltage;
   wherein each of the first and second transistors is a PNP transistor.

2. A self-excited DC-DC converter comprising:
   a first transistor for switching an input DC voltage to produce an output voltage whose voltage value is down converted from the input DC voltage;
   a primary winding one end of which is connected to a collector of the first transistor;
   a diode whose cathode is connected to a connection point of the first transistor and the primary winding and whose anode is connected to the ground;
   a capacitor connected between the other end of the primary winding and the ground;
   a feedback winding magnetically coupled to the primary winding and connected between a base and an emitter of the first transistor;
   a second transistor provided between the base and emitter of the first transistor for bypassing a base current of the first transistor in such a way that the amount of bypassing the base current is regulated in response to a value of the output voltage; and
   a third transistor whose base receives a feedback voltage which is proportional to the output voltage thereby regulating a base voltage of the second transistor;
   wherein the base voltage of the second transistor is regulated by a product of a collector current of the third transistor and a resistor connected to the collector of the third transistor.

3. A self-excited DC-DC converter comprising:
   a first transistor for switching an input DC voltage to produce an output voltage whose voltage value is down converted from the input DC voltage;
   a primary winding one end of which is connected to a collector of the first transistor;
   a diode whose cathode is connected to a connection point of the first transistor and the primary winding and whose anode is connected to the ground;
   a capacitor connected between the other end of the primary winding and the ground;
   a feedback winding magnetically coupled to the primary winding and connected between a base and an emitter of the first transistor;
   a second transistor provided between the base and emitter of the first transistor for bypassing a base current of the first transistor in such a way that the amount of bypassing the base current is regulated in response to a value of the output voltage; and
   a temperature compensation means for compensating a temperature change in the output voltage caused by a load circuit, the temperature compensation means having a temperature characteristics which is opposite to that of the load circuit.

4. A self-excited DC-DC converter as defined in claim 3, wherein the temperature compensation means is a zener diode provided between the output voltage and the second transistor for compensating the amount of bypassing the base current to the first transistor.

5. A self-excited DC-DC converter as defined in claim 2 further comprising a temperature compensation means for compensating a temperature change in the output voltage caused by a load circuit, the temperature compensation means having a temperature characteristics which is opposite to that of the load circuit, and wherein the feedback voltage is produced by a voltage divider provided with the output voltage and formed of a plurality of resistors.

6. A self-excited DC-DC converter as defined in claim 5, wherein the temperature compensation means is a zener diode connected between the voltage divider and the third transistor for compensating the amount of bypassing the base current to the first transistor.

7. A self-excited DC-DC converter as defined in claim 3, wherein the load circuit includes a switching power supply having a switching element and provided with the output voltage for switching the output voltage by repeatedly changing between ON and OFF states.

8. A power supply device comprising:
   a self-excited DC-DC converter for producing an output voltage by down converting an input voltage; and
   a switching power supply having a switching element for switching the output voltage from the DC-DC converter to produce a desired voltage level;
   wherein the self-excited DC-DC converter, comprising:
      a first transistor for switching the input voltage to produce the output voltage;
      a primary winding one end of which is connected to a collector of the first transistor;
      a diode whose cathode is connected to a connection point of the first transistor and the primary winding and whose anode is connected to the ground;

a capacitor connected between the other end of the primary winding and the ground;

a feedback winding magnetically coupled to the primary winding and connected between a base and an emitter of the first transistor; and a second transistor provided between the base and emitter of the first transistor for by-passing a base current of the first transistor in such a way that the amount of bypassing the base current is regulated in response to a value of the output voltage;

wherein a suspending means is provided in the switching power supply for temporarily suspending an operation of the switching element until the output voltage of the DC-DC converter reaches a predetermined voltage level;

and wherein the switching power supply includes a first series circuit provided between output terminals of the DC-DC converter and comprised of a resonant circuit configured with a primary winding of a transformer and a resonant capacitor, the MOSFET as the switching element, and a first resistor, and a second series circuit provided between the output terminals and comprised of an NPN transistor whose base is connected to a drain of the MOSFET and whose collector is connected to a gate of the MOSFET, and whose emitter is connected to the ground, a second resistor, and a charge capacitor, wherein the gate of the MOSFET is connected to a connection point of the second resistor and the charge capacitor through a feedback winding of the transformer.

9. A power supply device as defined in claim 8, wherein each of the first and second transistors in the DC-DC converter is a PNP transistor.

10. A power supply device as defined in claim 8, wherein the DC-DC converter further comprising a third transistor whose base receives a feedback voltage proportional to the output voltage thereby regulating a base voltage of the second transistor.

11. A power supply device as defined in claim 10, wherein the feedback voltage in the DC-DC converter is produced by a voltage divider which divides the output voltage of the DC-DC converter wherein the voltage divider is formed of a plurality of resistors.

12. A power supply device as defined in claim 10, wherein the base voltage of the second transistor is regulated by a product of a collector current of the third transistor and a resistor connected to the collector of the third transistor.

* * * * *